US007460353B2

(12) United States Patent
Shirakawa et al.

(10) Patent No.: US 7,460,353 B2

(45) Date of Patent: Dec. 2, 2008

(54) HIGH-VOLTAGE CAPACITOR, HIGH-VOLTAGE CAPACITOR DEVICE AND MAGNETRON

(75) Inventors: Yukihiko Shirakawa, Tokyo (JP); Tsukasa Sato, Tokyo (JP); Isao Fujiwara, Tokyo (JP); Hisashi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 342 days.

(21) Appl. No.: 11/386,742

(22) Filed: Mar. 23, 2006

(65) Prior Publication Data

US 2006/0227470 A1 Oct. 12, 2006

(30) Foreign Application Priority Data

Apr. 11, 2005 (JP) ............................ 2005-113837

(51) Int. Cl.
*H01G 4/35* (2006.01)
*H01G 4/005* (2006.01)

(52) U.S. Cl. ...................................... 361/302; 361/303

(58) Field of Classification Search ......... 361/302-303, 361/311

See application file for complete search history.

(56) References Cited

U.S. PATENT DOCUMENTS

| | | | | | |
|---|---|---|---|---|---|
| 4,370,698 | A | * | 1/1983 | Sasaki | 361/330 |
| 4,768,129 | A | * | 8/1988 | Sasaki et al. | 361/302 |
| 4,797,596 | A | * | 1/1989 | Tsuzurahara | 315/5.13 |
| 4,811,161 | A | * | 3/1989 | Sasaki et al. | 361/302 |
| 5,040,091 | A | * | 8/1991 | Yamaoka et al. | 361/302 |
| 5,142,436 | A | * | 8/1992 | Lee et al. | 361/302 |
| 5,206,786 | A | * | 4/1993 | Lee | 361/302 |
| 5,451,752 | A | * | 9/1995 | Jun et al. | 219/761 |
| 5,455,405 | A | * | 10/1995 | Jun | 219/761 |
| 6,288,886 | B1 | * | 9/2001 | Sato et al. | 361/302 |

FOREIGN PATENT DOCUMENTS

| | | | | |
|---|---|---|---|---|
| JP | 06196362 | A | * | 7/1994 |
| JP | 08-031681 | | | 2/1996 |
| JP | 8-78154 | | | 3/1996 |

* cited by examiner

*Primary Examiner*—Eric Thomas
(74) *Attorney, Agent, or Firm*—Oblon, Spivak, McClelland, Maier & Neustadt, P.C.

(57) ABSTRACT

A high-voltage capacitor is intended for use in a high-voltage capacitor device having at least two through conductors. The high-voltage capacitor includes a dielectric porcelain, an individual electrode, and a common electrode. At least two spaced individual electrodes are provided on one surface of the dielectric porcelain and intended to be connected one-to-one to the through conductors positioned outside the dielectric porcelain. The common electrode is provided on the other surface of the dielectric porcelain.

19 Claims, 10 Drawing Sheets

HIGH-VOLTAGE CAPACITOR, HIGH-VOLTAGE CAPACITOR DEVICE AND MAGNETRON

BACKGROUND OF THE INVENTION

1. Field of the Invention

The present invention relates to a high-voltage capacitor, a high-voltage capacitor device and a magnetron using this high-voltage capacitor device.

2. Description of the Related Art

As disclosed in Japanese patent application publication No. 8-78154, high-voltage capacitors of this type, which are incorporated into a magnetron as a filter to eliminate unwanted radiation waves generated by oscillation of the magnetron, generally comprise a high-voltage capacitor, through conductors (central conductors) and a grounding metal.

The high-voltage capacitor comprises a dielectric porcelain with two spaced through holes, two individual electrodes provided on one surface of the dielectric porcelain, and a common electrode provided on the other surface of the dielectric porcelain. The through conductors are disposed to pass through the through holes of the dielectric porcelain, and each through conductor is electrically and mechanically connected to each individual electrode. The grounding metal is electrically and mechanically connected to the common electrode and is electrically insulated from the through conductors.

In this type of high-voltage capacitor device, the cost of the dielectric porcelain makes up a large proportion of the total cost. The cost of the dielectric porcelain is proportional to its volume. In order to decrease the total cost, therefore, the dielectric porcelain is required to be reduced in volume for downsizing.

In the high-voltage capacitor of this type, however, the dielectric porcelain is formed with the two spaced through holes and the through conductors are disposed to pass through the through holes. This structure requires to keep a sufficient distance between the through holes to assure full voltage withstand performance between the through conductors, which sets a limit to reducing the size of the dielectric porcelain. Specifically, the size of the dielectric porcelain measured in an arrangement direction of the through hole is made up of a distance measured between centers of the through holes and twice a distance measured outwardly from the center of the through hole to the outer periphery of the dielectric porcelain. This sets a limit to the size reduction of the dielectric porcelain, and, consequently, to the cost reduction.

In addition, the dielectric porcelain having a relatively complex shape with the two spaced through holes tends to complicated structures of other components to be combined with this dielectric porcelain, such as an electrode connection metal to electrically and mechanically connect the through conductor to the individual electrode, a grounding metal to be electrically and mechanically connected to the common electrode of the high-voltage capacitor, an insulating cover for sheathing, and an insulating case.

SUMMARY OF THE INVENTION

It is an object of the present invention to provide a high-voltage capacitor which enables size reduction, a high-voltage capacitor device, and a magnetron.

It is another object of the present invention to provide a high-voltage capacitor which enables cost reduction, a high-voltage capacitor device, and a magnetron.

A high-voltage capacitor according to the present invention includes a dielectric porcelain, an individual electrode, and a common electrode. At least two spaced individual electrodes are provided on one surface of the dielectric porcelain and intended to be connected one-to-one to the through conductors positioned outside the dielectric porcelain. The common electrode is provided on the other surface of the dielectric porcelain.

The high-voltage capacitor of the present invention may be combined with the through conductors and a grounding metal to provide the high-voltage capacitor device. Each of the through conductors is positioned outside the dielectric porcelain and is electrically connected to each of the individual electrodes. The grounding metal is electrically connected to the common electrode.

In the high-voltage capacitor of the present invention, each of the individual electrodes is to be connected to each of the through conductors positioned outside the dielectric porcelain. As distinct from the prior art, the dielectric porcelain has no through holes. That is, the size of the dielectric porcelain measured in an arrangement direction of the through conductors becomes shorter as compared with the conventional dielectric porcelain, because the arched portions defining the through holes are eliminated from the dielectric porcelain. This enables the size reduction of the dielectric porcelain, and, consequently, to the cost reduction.

In addition, the dielectric porcelain having a simple shape without any through holes tends to simplify structures of other components to be combined with this dielectric porcelain, such as an electrode connection metal to electrically and mechanically connect the through conductor to the individual electrode, a grounding metal to be electrically and mechanically connected to the common electrode of the high-voltage capacitor, and the like.

Further, elimination of a step of forming through holes in the dielectric porcelain leads to simplifying a manufacturing process, which may enhance a product yield and enable the cost reduction.

Moreover, since each of the through conductors is electrically connected to each of the individual electrodes and the grounding metal is electrically connected to the common electrode, the high-voltage capacitor device according to the present invention has similar frequency characteristics, e.g., unwanted radiation absorption characteristics, to the conventional high-voltage capacitor device and may be employed as a filter of a magnetron.

The conventional use of the dielectric porcelain with the through holes is based on a fixed idea that a radiation noise may leak from sides of the through conductors unless the through conductors are made to pass through the dielectric porcelain. According to this conventional idea, the high-voltage capacitor device of the present invention may appear to cause the leakage of the radiation noise because the through conductors are positioned outside the dielectric porcelain. However, the high-voltage capacitor device of the present invention has been to cause no radiation noise and exhibit comparable characteristics to the conventional high-voltage capacitor device with the through holes.

Other objects, structural features and advantages of the present invention are explained in further detail by referring to the attached drawings. The attached drawings simply present illustrations of embodiments.

DESCRIPTIONS OF THE PREFERRED EMBODIMENTS

Figure 1:
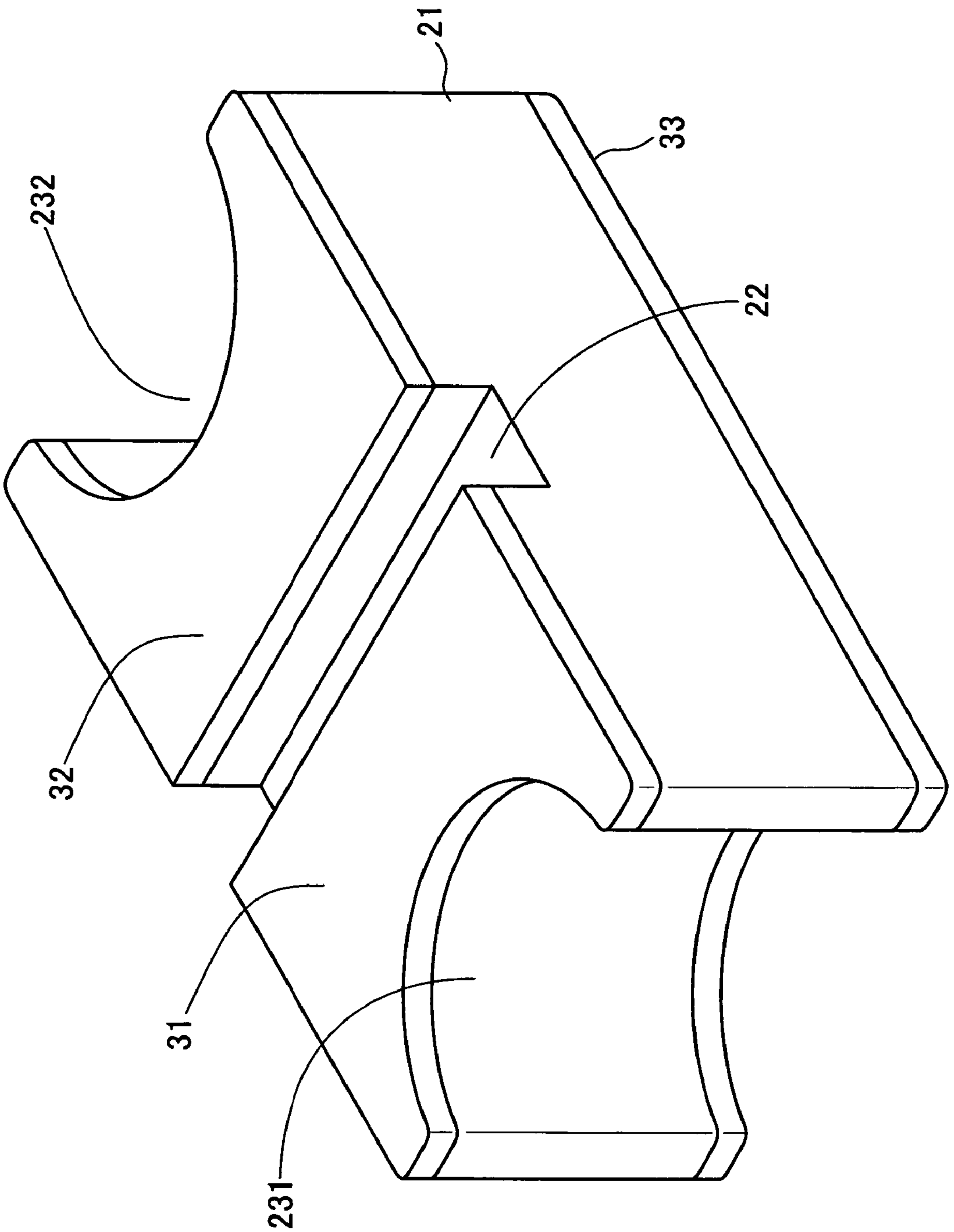
FIG. 1 is a perspective view of a high-voltage capacitor according to one embodiment of the present invention.
Figure 2:
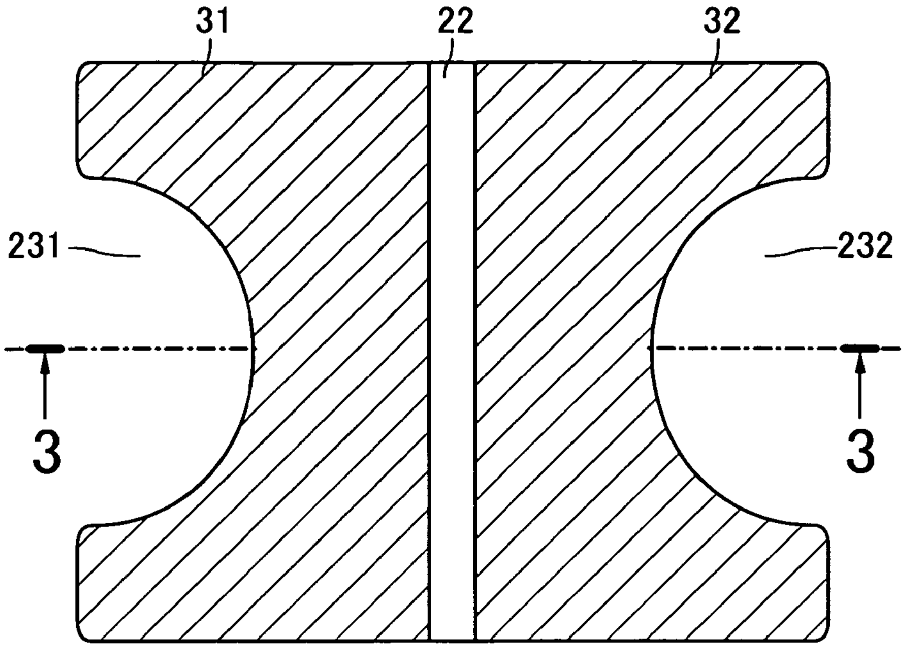
FIG. 2 is a plan view of the high-voltage capacitor shown in FIG. 1.
Figure 3:
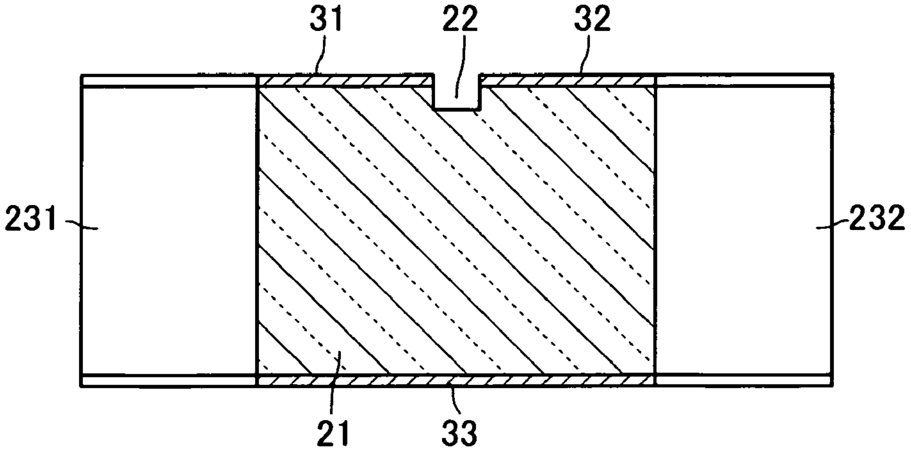
FIG. 3 is a sectional view taken along line 3-3 in FIG. 2.

Referring to FIG. 1, a high-voltage capacitor 1 according to one embodiment of the present invention includes a dielectric porcelain 21, individual electrodes 31 and 32 and a common electrode 33.

The composition of the dielectric porcelain 21 is arbitrary. Specific examples include the composition whose main constituent is $BaTiO_3$—$BaZrO_3$—$CaTiO_3$ with a single or a plurality of additives mixed in. It is desirable that the dielectric porcelain 21 is adequately rounded out to prevent a mechanical or electrical stress concentration.

Figure 4:
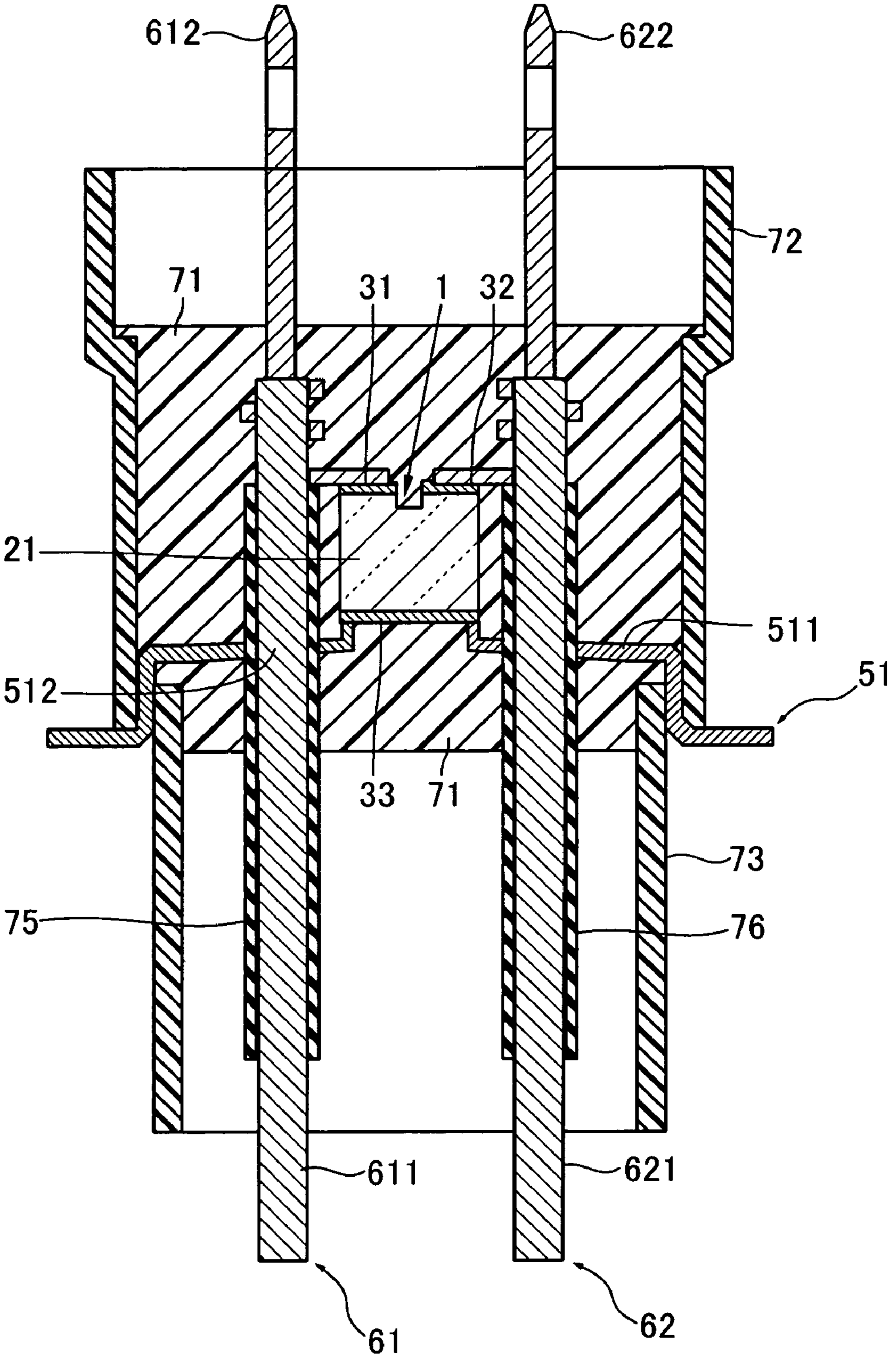
FIG. 4 is a sectional front view of a high-voltage capacitor device according to another embodiment of the present invention.

The individual electrodes 31 and 32 are adapted for one-to-one connection to through conductors 61 and 62 (see FIG. 4). At least two individual electrodes 31 and 32 are provided on one surface of the dielectric porcelain 21. The individual electrodes 31 and 32 are spaced apart by a depression 22.

The common electrode 33 is adapted for connection to a grounding metal 51 (see FIG. 4) and provided on the other surface of the dielectric porcelain 21.

The dielectric porcelain 21 includes the depression 22 and conductor guide recesses 231 and 232. The depression 22 is provided between the individual electrodes 31 and 32 to increase a creeping distance therebetween. Although not illustrated, the depression 22 may be substituted by a projection. A width and a depth of the depression 22 are determined so as to ensure a desired creeping distance between the individual electrodes 31 and 32.

The conductor guide recesses 231 and 232 are adapted for guiding each of the through conductors 61 and 62, respectively. The conductor guide recesses 231 and 232 are provided on the opposite sides of the dielectric porcelain 21 facing each other across the depression 22.

It is preferable that the conductor guide recesses 231 and 232 are symmetrically formed about a centerline along a boundary between the individual electrodes 31 and 32 (or the depression 22). The shape of the conductor guide recesses 231 and 232 may be semicircular.

FIG. 4 is a sectional front view of a high-voltage capacitor device according to another embodiment of the present invention. The illustrated high-voltage capacitor device includes the high-voltage capacitor 1, the through conductors 61 and 62, a grounding metal 51, an insulating resin 71, an insulating case 72, an insulating cover 73 and insulating tubes 75 and 76.

Referring to FIG. 4, the grounding metal 51 is at ground potential in operating condition, being constituted of conductive metal materials, such as iron, copper, brass or the like. The grounding metal 51 has a raised portion 511. The raised portion 511 is provided with a through hole 512 passing through from one side to the other.

The high-voltage capacitor 1, which is the same as shown in FIG. 1, is supported on the raised portion 511 provided on the grounding metal 51. The common electrode 33 is electrically and mechanically connected to the raised portion 511 by means of soldering or the like.

The through conductor 61 includes a through portion 611 and an electrode connector 612. Also, the through conductor 62 includes a through portion 621 and an electrode connector 622. The through conductors 61, 62 are constituted of conductive metal materials, such as iron, copper, brass or the like. The through portions 611 and 621 do not pass through the dielectric porcelain 21. In other words, the through portions 611 and 621 are provided outside the dielectric porcelain 21 facing each other across the high-voltage capacitor 1.

The through portion 611 extends in close proximity to one side of the dielectric porcelain 21 to pass through the through hole 512 of the grounding metal 51 while being electrically and mechanically connected to the electrode connector 612 by means of caulking or the like. Also, the through portion 621 extends in close proximity to the other side of the dielectric porcelain 21 to pass through the through hole 512 of the grounding metal 51 while being electrically and mechanically connected to the electrode connector 622 by means of caulking or the like.

The electrode connectors 612 and 622 are constituted of conductive materials to function as tab connectors (or power supply terminals). The electrode connectors 612 and 622 are electrically and mechanically connected to the individual electrode 31 and 32, respectively, by means of soldering or the like.

The insulating tubes 75 and 76 cover the through conductors 61 and 62, respectively, while passing through the through hole 512. The insulating tube 75 positively assures that the through conductor 61 is insulated from the grounding metal 51. Also, the insulating tube 76 positively assures that the through conductor 62 is insulated from the grounding metal 51. The insulating tubes 75 and 76 may be constituted of polyethylene terephthalate (PET), polybutylene terephthalate (PBT), silicone resin or the like.

The insulating case 72 is provided on one side of the grounding metal 51 with one end thereof fitted against an outer peripheral wall of the raised portion 511. The insulating cover 73 is provided on the other side of the grounding metal 51 with one end thereof fitted against the inner peripheral wall of the raised portion 511. Both of the insulating case 72 and the insulating cover 73 may be constituted of PBT, PET, modified melanin resin or the like.

The insulating resin 71 fills a space inside the insulating case 72 and a space inside the insulating cover 73 to cover the capacitor 1. This assures a sufficient degree of reliability even when the high-voltage capacitor device is operated in a hot and humid environment. The insulating resin 71 may be constituted of a thermo-setting resin such as urethane resin or an epoxy resin, a phenol resin, a silicone resin or the like.

In the high-voltage capacitor 1 according to one embodiment of the present invention, as set forth above, each of the individual electrodes 31 and 32 is to be connected to each of the through conductors 61 and 62 positioned outside the dielectric porcelain 21. As distinct from the prior art, the dielectric porcelain 21 has no through holes. That is, the size of the dielectric porcelain 21 measured in an arrangement direction of the through conductors becomes shorter as compared with the conventional dielectric porcelain 21, because the arched portions defining the through holes are eliminated from the dielectric porcelain 21. This enables size reduction of the dielectric porcelain 21, and consequently, the cost reduction.

In addition, the dielectric porcelain 21 having a simple shape without any through holes tends to simplify structures of other components to be combined with this dielectric porcelain 21, such as an electrode connection metal to electrically and mechanically connect the through conductors 61 and 62 to the individual electrode 31 and 32, a grounding metal 51 to be electrically and mechanically connected to the common electrode 33 of the high-voltage capacitor.

Further, elimination of the step of forming through holes in the dielectric porcelain 21 leads to simplifying a manufacturing process, which may enhance a product yield and enable the cost reduction.

Moreover, since each of the through conductors 61 and 62 is electrically connected to each of the individual electrodes 31 and 32, respectively, and the grounding metal 51 is electrically connected to the common electrode 33, the high-voltage capacitor device according to the present invention has similar frequency characteristics, e.g. unwanted radiation absorption characteristics, to the conventional high-voltage capacitor device and may be employed as a filter of a magnetron.

The conventional use of the dielectric porcelain 21 with the through holes is based on a fixed idea that a radiation noise may leak from sides of the through conductors 61 and 62 unless the through conductors 61 and 62 are made to pass through the dielectric porcelain 21. According to this conventional idea, the high-voltage capacitor device of the present invention may appear to cause the leakage of the radiation noise because the through conductors 61 and 62 are positioned outside the dielectric porcelain 21. However, the high-voltage capacitor device of the present invention has been confirmed to cause no radiation noise and exhibit comparable characteristics to the conventional the high-voltage capacitor device with the through holes.

For example, in the illustrated embodiment, a quasi-peak value of the radiated noise (see International Standard CISPR 11) was equal to or less than 37 (dBμV/m) in the frequency band of 300 to 1000 MHz, showing excellent characteristics as the conventional device does.

In the illustrated embodiment, furthermore, the conductor guide recesses 231 and 232 enable the through conductors 61 and 62 to be located close to the centers of the individual electrodes 31 and 32 as seen in the plan view. This structure enables the through conductors 61 and 62 to be located close to the center of the capacitor constituted of the individual electrodes 31, 32 and the common electrode 33, whereby good filter characteristics are obtained.

Figure 5:
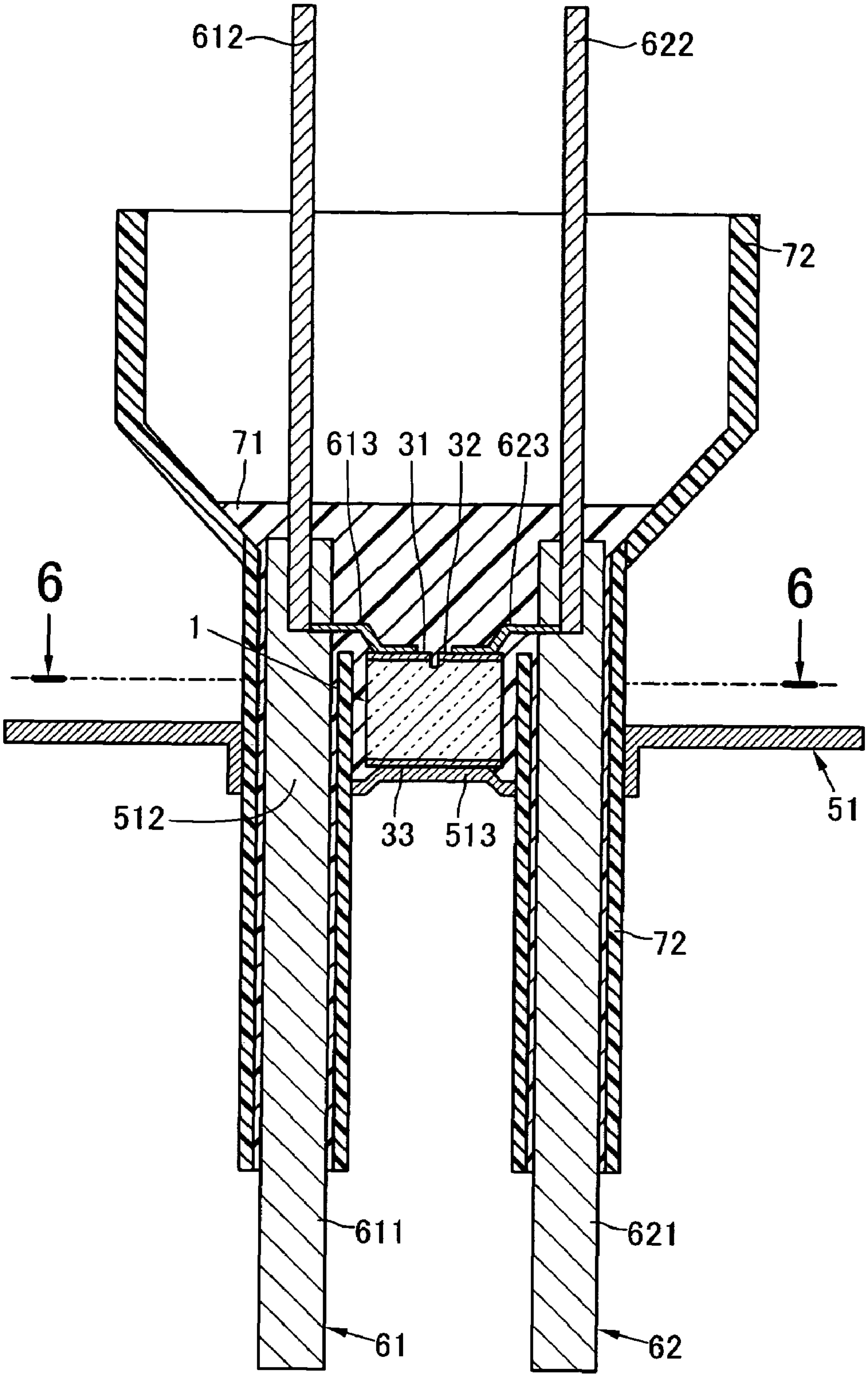
FIG. 5 is a sectional front view of a high-voltage capacitor device according to still another embodiment of the present invention.
Figure 6:
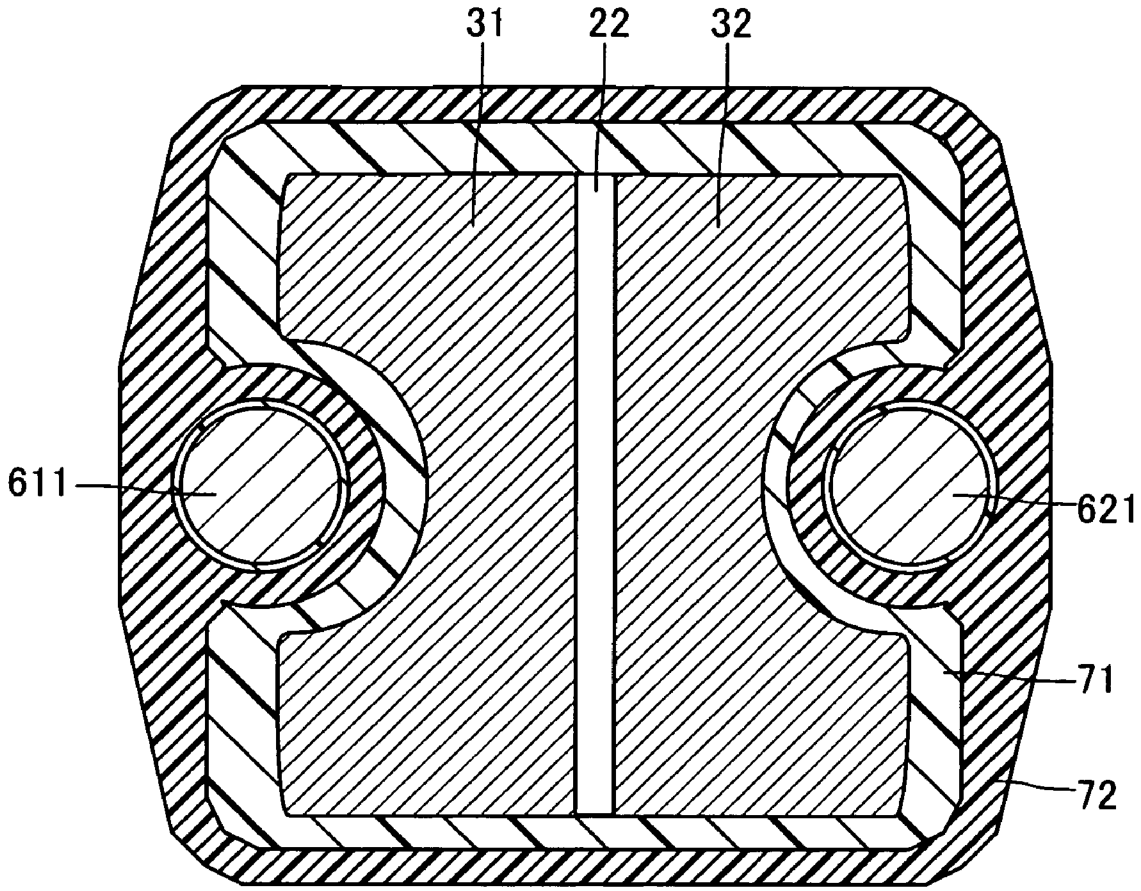
FIG. 6 is a sectional view taken along line 6-6 in FIG. 5.

FIG. 5 is a sectional front view of a high-voltage capacitor device according to still another embodiment of the present invention; FIG. 6 is a sectional view taken along line 6-6 in FIG. 5. In figures below, the same reference numerals denote parts corresponding to the constituent parts depicted in FIGS. 1 to 4. The following embodiments demonstrate the same effects and advantages as the foregoing embodiment, although redundant description is not made.

The high-voltage capacitor device shown in FIGS. 5 and 6 includes the high-voltage capacitor 1, the through conductors 61 and 62, the grounding metal 51, the insulating resin 71, the insulating case 72 and lead conductors 613 and 623.

The lead conductor 613 provides electrical and mechanical connection between the electrode connector 612 and the individual electrode 31. The lead conductor 623 provides electrical and mechanical connection between the electrode connector 622 and the individual electrode 32. Means for the electrical and mechanical connection may be soldering, caulking or the like.

The high-voltage capacitor 1 is supported on a non-raised portion 513 of the grounding metal 51. The common electrode 33 is electrically and mechanically connected to the non-raised portion 513 by means of soldering or the like.

In the illustrated high-voltage capacitor device, the through holes are not provided in the dielectric porcelain 21. This configuration permits a decrease in the number of components in the entire high-voltage capacitor device, which facilitates the cost reduction and also improves the reliability.

Figure 7:
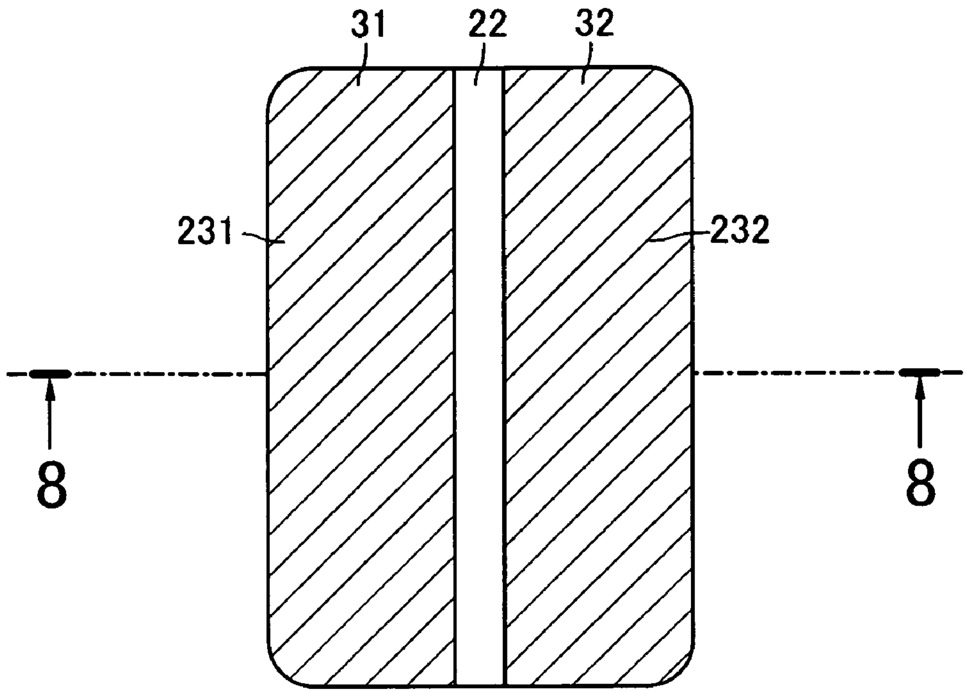
FIG. 7 is a plan view of a high-voltage capacitor according to still another embodiment of the present invention.
Figure 8:
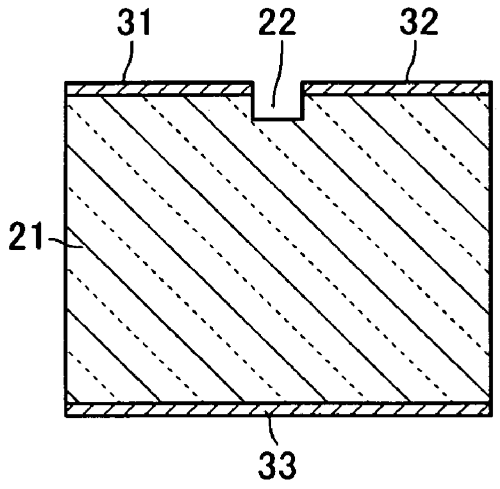
FIG. 8 is a sectional view taken along line 8-8 in FIG. 7.

FIG. 7 is a plan view of a high-voltage capacitor according to still another embodiment of the present invention; FIG. 8 is a sectional view taken along line 8-8 in FIG. 7.

The high-voltage capacitor 1 shown in FIGS. 7 and 8 includes the dielectric porcelain 21, the individual electrodes 31, 32 and the common electrode 33. The dielectric porcelain 21 has the depression 22, but the conductor guide recesses 231 and 232 (see FIG. 1) are not provided.

Figure 9:
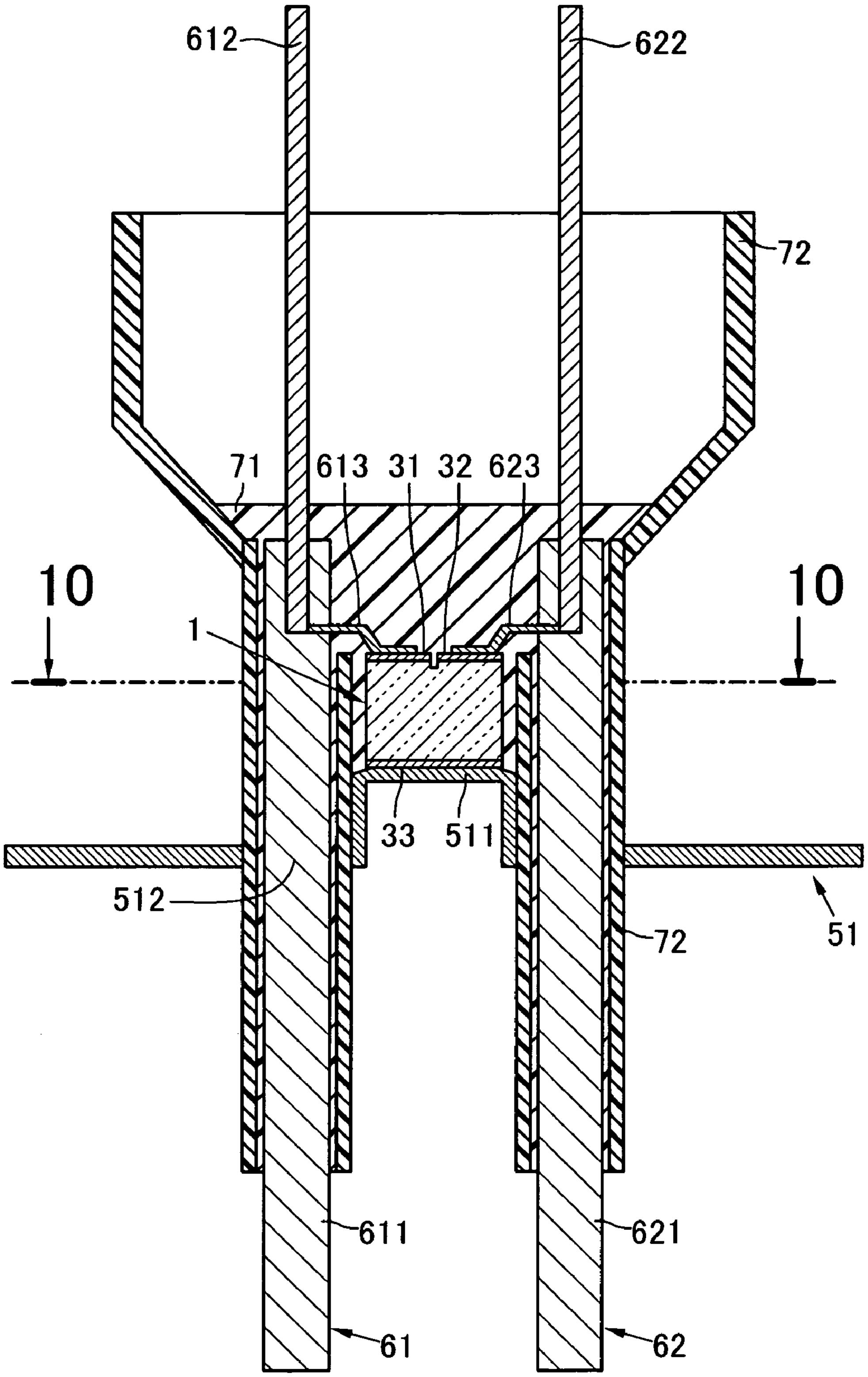
FIG. 9 is a sectional front view of a high-voltage capacitor device according to still another embodiment of the present invention.
Figure 10:
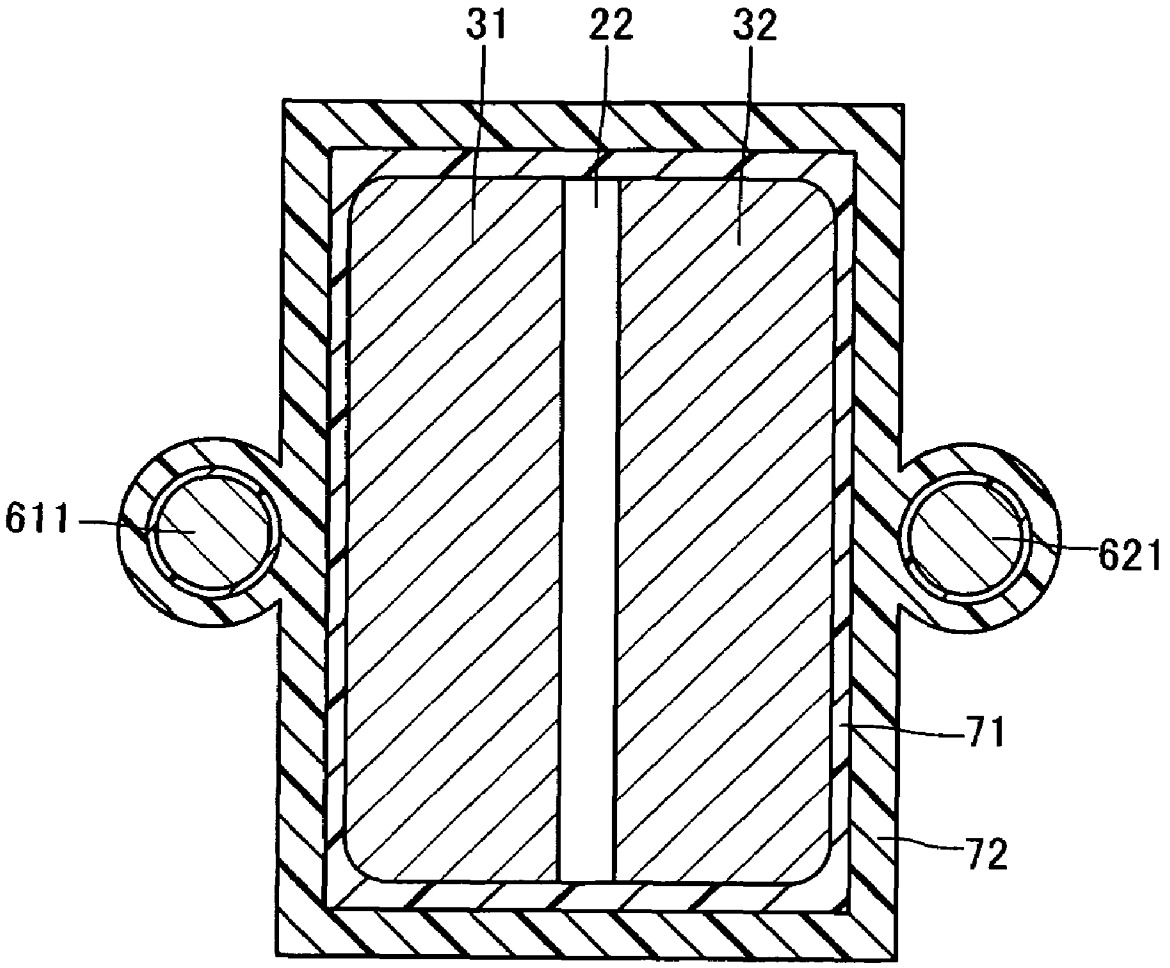
FIG. 10 is a sectional view taken along line 10-10 in FIG. 9.

FIG. 9 is a sectional front view of a high-voltage capacitor device according to still another embodiment of the present invention; FIG. 10 is a sectional view taken along line 10-10 in FIG. 9.

The high-voltage capacitor device shown in FIGS. 9 and 10 includes the high-voltage capacitor 1, the through conductors 61 and 62, the grounding metal 51, the insulating resin 71, the insulating case 72 and the lead conductors 613 and 623.

The high-voltage capacitor 1 is supported on the raised portion 511 of the grounding metal 51. The common electrode 33 is electrically and mechanically connected to the raised portion 511 by means of soldering or the like.

Figure 11:
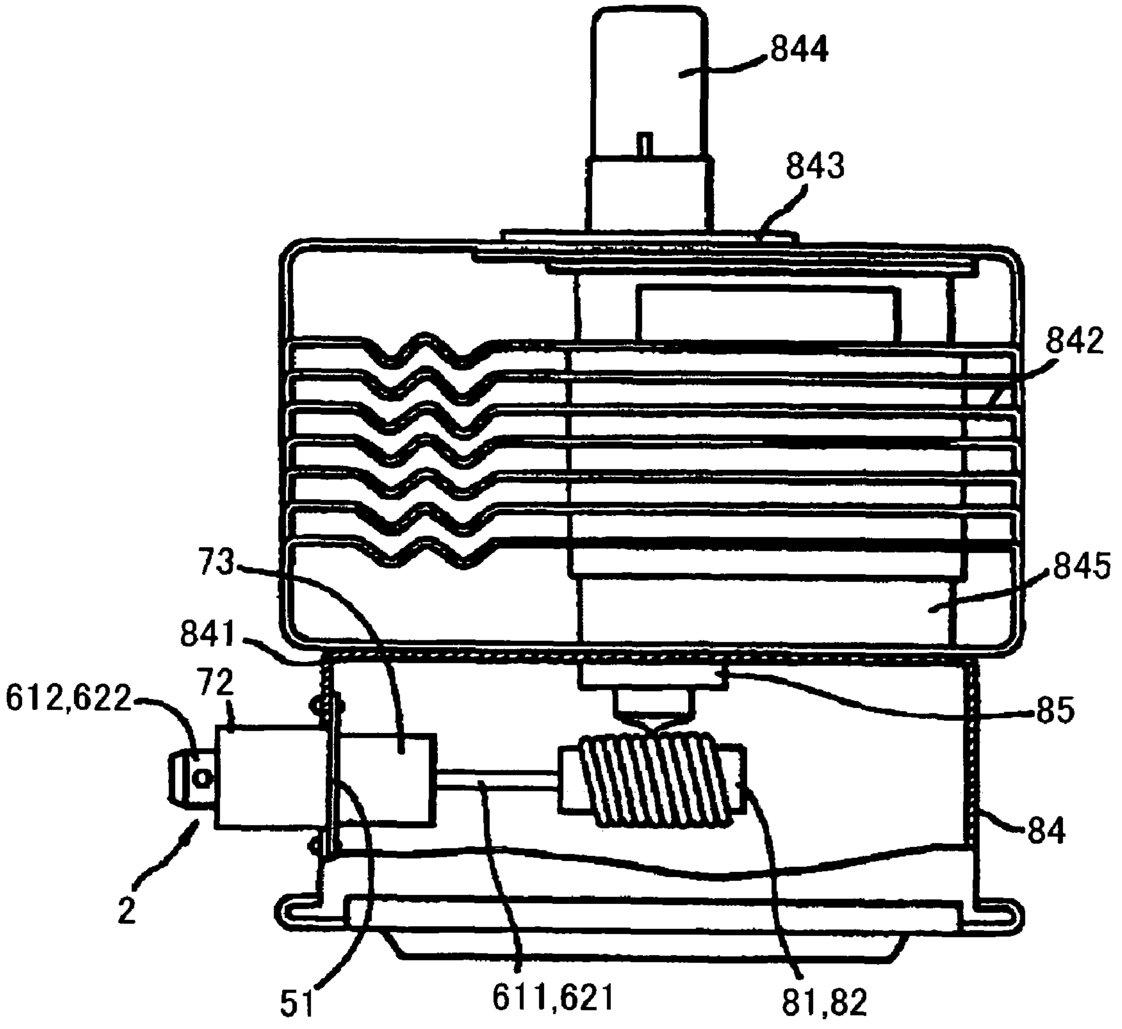
FIG. 11 is a partial cut-away section of a magnetron according to still another embodiment of the present invention.
Figure 12:
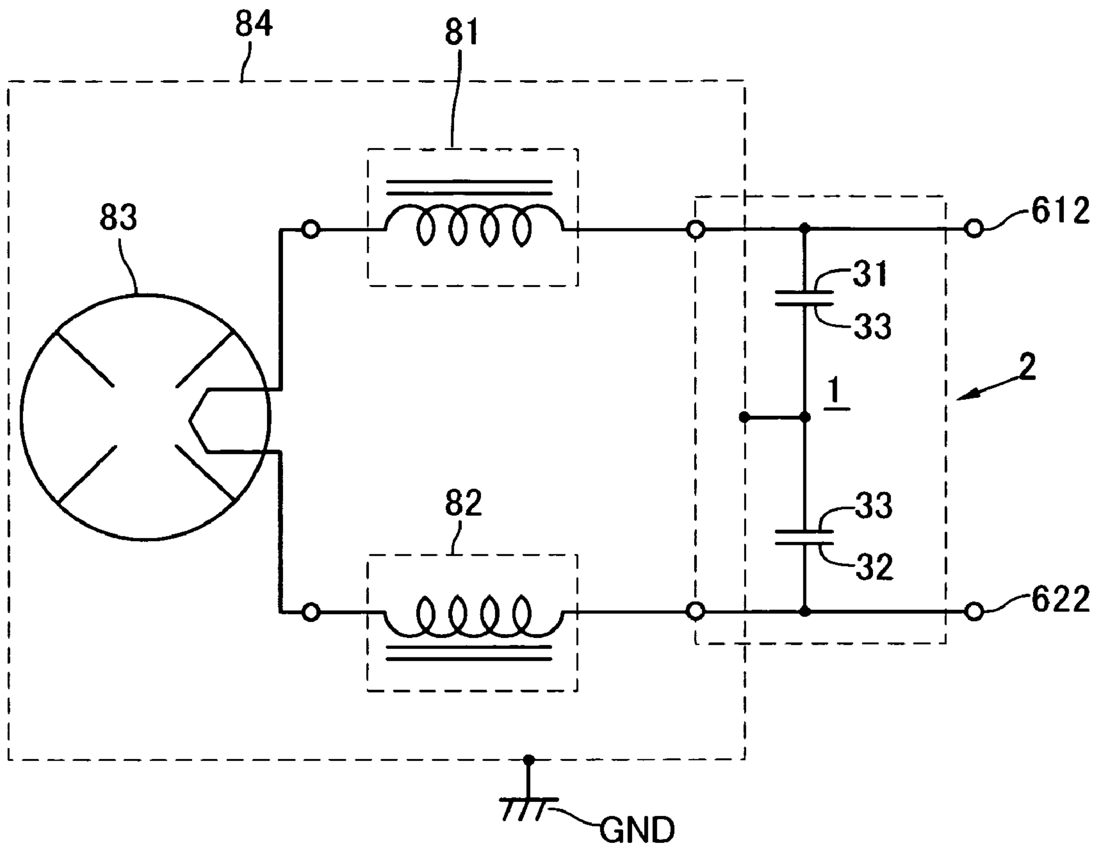
FIG. 12 is an electrical diagram of the magnetron shown in FIG. 11.

FIG. 11 is a partial cut-away section of a magnetron according to still another embodiment of the present invention; FIG. 12 is an electrical diagram of the magnetron shown in FIG. 11.

The magnetron shown in FIG. 11 is, for example, employed in a microwave oven. The illustrated magnetron includes a filter box 84, a cathode stem 85 and a high-voltage capacitor device 2.

The filter box 84 encloses the cathode stem 85, being connected to a ground electrode, GND (see FIG. 12). The filter box 84 is provided with a cooling fin 842, a gasket 843, an RF output end 844 and a magnet 845.

The high-voltage capacitor device 2 is provided passing through a through hole formed in a side plate 841 of the filter box 84 with its grounding metal 51 being electrically and mechanically connected to the side plate 841.

Inductors 81 and 82 are connected to the cathode terminal of the cathode stem 85 and the high-voltage capacitor device 2 inside the filter box 84.

Referring to FIG. 12, the high-voltage capacitor device 2 constitutes a filter in conjunction with the inductors 81 and 82. One ends of the inductors 81 and 82 are led to an oscillator 83. The other ends of the inductors 81 and 82 are led to the individual electrodes 31 and 32, respectively.

A high voltage of approximately 4 $kV_{0-P}$ having a commercial frequency or a frequency within a range of 20 to 40 kHz is supplied to the electrode connectors 612 and 622 of the through conductors 61 and 62 in the magnetron, causing the magnetron to oscillate and generate a noise.

At this time, the noise coming out of the magnetron can be reduced through the filtering effect achieved by the high-voltage capacitor device.

While the present invention has been particularly shown and described with respect to preferred embodiments thereof, it will be understood by those skilled in the art that various changes in form and detail may be made therein without departing from the spirit, scope and teaching of the invention.

What is claimed is:

1. A high-voltage capacitor for use in a high-voltage capacitor device having at least two through conductors, comprising:

a dielectric porcelain, at least two spaced individual electrodes provided on one surface of said dielectric porcelain, said individual electrodes configured to connect one-to-one to said through conductors positioned outside said dielectric porcelain, and a common electrode provided on an other surface of said dielectric porcelain.

2. The high-voltage capacitor of to claim 1, wherein:

said dielectric porcelain has a depression or a projection between said individual electrodes to increase a creeping distance between said individual electrodes.

3. The high-voltage capacitor of claim 2, wherein:

said dielectric porcelain has conductor guide recesses on opposite sides in an arrangement direction of said individual electrodes.

4. The high-voltage capacitor of claim 1, wherein:

said dielectric porcelain has conductor guide recesses on opposite sides in an arrangement direction of said individual electrodes.

5. The high-voltage capacitor of claim 4, wherein:

a shape of said conductor guide recesses is semicircular.

6. A high-voltage capacitor device comprising:

a high-voltage capacitor, through conductors and a grounding metal, wherein:

said high-voltage capacitor includes a dielectric porcelain, at least two spaced individual electrodes provided on one surface of said dielectric porcelain, and a common electrode provided on an other surface of said dielectric porcelain, said through conductors are positioned outside said dielectric porcelain and electrically connected one-to-one to said individual electrodes, and said grounding metal supports said high-voltage capacitor on one side thereof and is electrically connected to said common electrode.

7. The high-voltage capacitor device of claim 6, wherein:

said grounding metal has a raised portion provided with a through hole, said high-voltage capacitor is supported by said raised portion, and said through conductors pass through said through hole.

8. The high-voltage capacitor device of claim 7, wherein:

said dielectric porcelain has a depression or a projection between said individual electrodes to increase a creeping distance between said individual electrodes.

9. The high-voltage capacitor device of claim 7, wherein:

said dielectric porcelain has conductor guide recesses on opposite sides in an arrangement direction of said individual electrodes.

10. The high-voltage capacitor device of claim 9, wherein:

said dielectric porcelain has a depression or a projection between said individual electrodes to increase a creeping distance between said individual electrodes.

11. A magnetron comprising said high-voltage capacitor device of claim 7, said high-voltage capacitor device being incorporated as a filter.

12. The high-voltage capacitor device of claim 6, wherein:

said dielectric porcelain has a depression or a projection between said individual electrodes to increase a creeping distance between said individual electrodes.

13. The high-voltage capacitor device of claim 6, wherein:

said dielectric porcelain has conductor guide recesses on opposite sides in an arrangement direction of said individual electrodes.

14. A magnetron comprising said high-voltage capacitor device of claim 12, said high-voltage capacitor device being incorporated as a filter.

15. The high-voltage capacitor device of claim 13, wherein:

said dielectric porcelain has a depression or a projection between said individual electrodes to increase a creeping distance between said individual electrodes.

16. The high-voltage capacitor device of claim 13, wherein:

a shape of said conductor guide recesses is semicircular.

17. A magnetron comprising said high-voltage capacitor device of claim 16, said high-voltage capacitor device being incorporated as a filter.

18. A magnetron comprising said high-voltage capacitor device of claim 13, said high-voltage capacitor device being incorporated as a filter.

19. A magnetron comprising said high-voltage capacitor device of claim 6, said high-voltage capacitor device being incorporated as a filter.

* * * * *